US012031546B2

(12) United States Patent
Iwakiri

(10) Patent No.: US 12,031,546 B2
(45) Date of Patent: Jul. 9, 2024

(54) SCROLL CASING AND CENTRIFUGAL COMPRESSOR

(71) Applicant: MITSUBISHI HEAVY INDUSTRIES ENGINE & TURBOCHARGER, LTD., Sagamihara (JP)

(72) Inventor: Kenichiro Iwakiri, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 26 days.

(21) Appl. No.: 17/794,118

(22) PCT Filed: Apr. 17, 2020

(86) PCT No.: PCT/JP2020/016871
§ 371 (c)(1),
(2) Date: Jul. 20, 2022

(87) PCT Pub. No.: WO2021/210164
PCT Pub. Date: Oct. 21, 2021

(65) Prior Publication Data

US 2023/0049412 A1 Feb. 16, 2023

(51) Int. Cl.

*F04D 29/44* (2006.01)
*F04D 17/10* (2006.01)
*F04D 29/42* (2006.01)

(52) U.S. Cl.

CPC ......... *F04D 29/4206* (2013.01); *F04D 17/10* (2013.01); *F04D 29/441* (2013.01); *F04D 29/4226* (2013.01); *F05D 2220/40* (2013.01)

(58) Field of Classification Search

CPC .... F04D 29/441; F04D 29/442; F04D 29/445; F04D 29/44; F04D 29/4206; F04D 29/667; F04D 29/4226; F04D 17/10
See application file for complete search history.

(56) References Cited

U.S. PATENT DOCUMENTS 9,366,265 B2 * 6/2016 Tomita .................. F04D 29/441
9,541,094 B2 * 1/2017 Iwakiri ................. F04D 29/403
(Continued)

FOREIGN PATENT DOCUMENTS

JP 2005-2951 A 1/2005
JP 2005002951 A * 1/2005
(Continued)

OTHER PUBLICATIONS

JP-2005002951-Translation from Espacenet (Year: 2005).*
(Continued)

*Primary Examiner* — Justin D Seabe
*Assistant Examiner* — Behnoush Haghighian
(74) *Attorney, Agent, or Firm* — Birch, Stewart, Kolasch & Birch, LLP

(57) ABSTRACT

A scroll casing of a centrifugal compressor includes a scroll part forming a scroll passage of the centrifugal compressor. The scroll part has a near-circular scroll cross-section which includes a first arc portion extending from a connection position with a hub-side passage surface of a diffuser passage of the centrifugal compressor (first position) to a one-direction side (side toward fourth position), a second arc portion formed on the one-direction side of the first arc portion so as to include at least a part of a region between an outermost end in the radial direction (second position) and an innermost end in the radial direction (fourth position), and a third arc portion formed on the one-direction side of the second arc portion so as to include an end position of the scroll part on the one-direction side (fifth position) and satisfies a relationship of R2>R3, where R2 is a curvature radius of the second arc portion, and R3 is a curvature radius of the third arc portion.

9 Claims, 9 Drawing Sheets

(56) References Cited

U.S. PATENT DOCUMENTS

| | | | | |
|---|---|---|---|---|
| 9,562,541 | B2 * | 2/2017 | Iwakiri | F04D 29/4206 |
| 9,581,046 | B2 * | 2/2017 | Hoshi | F01D 25/24 |
| 10,125,787 | B2 * | 11/2018 | Rendel | F04D 29/422 |
| 10,302,096 | B2 * | 5/2019 | Kang | F04D 25/08 |
| 10,655,637 | B2 * | 5/2020 | Iwakiri | F04D 29/441 |
| 10,837,297 | B2 * | 11/2020 | Iwakiri | F01D 9/026 |
| 11,067,094 | B2 * | 7/2021 | Iwakiri | F04D 17/10 |
| 11,073,164 | B2 * | 7/2021 | Iwakiri | F02B 39/00 |
| 11,078,922 | B2 * | 8/2021 | Iwakiri | F04D 29/422 |
| 11,156,228 | B2 * | 10/2021 | Ueno | F04D 17/10 |
| 11,592,032 | B2 * | 2/2023 | Teramoto | F04D 29/441 |
| 2013/0266432 | A1 * | 10/2013 | Iwakiri | F04D 29/4206 415/204 |
| 2013/0272865 | A1 * | 10/2013 | Hoshi | F01D 25/24 415/204 |
| 2013/0294903 | A1 * | 11/2013 | Tomita | F04D 29/4206 415/204 |
| 2013/0343885 | A1 * | 12/2013 | Iwakiri | F04D 29/4206 415/204 |
| 2015/0275915 | A1 * | 10/2015 | Rendel | F04D 29/441 415/206 |
| 2018/0149170 | A1 * | 5/2018 | Iwakiri | F04D 29/441 |
| 2018/0291922 | A1 * | 10/2018 | Iwakiri | F04D 17/10 |
| 2018/0347382 | A1 * | 12/2018 | Iwakiri | F01D 9/026 |
| 2019/0055959 | A1 * | 2/2019 | Iwakiri | F04D 29/441 |
| 2021/0199125 | A1 * | 7/2021 | Teramoto | F04D 29/441 |

FOREIGN PATENT DOCUMENTS

| | | | |
|---|---|---|---|
| JP | 6053993 | B1 | 12/2018 |
| WO | WO 2017/072899 | A1 | 5/2017 |
| WO | WO 2018/174186 | A1 | 9/2018 |

OTHER PUBLICATIONS

Japanese Notice of Reasons for Refusal for Japanese Application No. 2022-515165, dated Jul. 6, 2023, with English translation.

International Preliminary Report on Patentability and Written Opinion of the International Searching Authority for International Application No. PCT/JP2020/016871, dated Oct. 27, 2022.

International Search Report for International Application No. PCT/JP2020/016871, dated Jun. 16, 2020.

* cited by examiner

SCROLL CASING AND CENTRIFUGAL COMPRESSOR

TECHNICAL FIELD

The present disclosure relates to a scroll casing and a centrifugal compressor including the scroll casing.

BACKGROUND

A centrifugal compressor used in a compressor part of a vehicle or marine turbocharger provides kinetic energy to a fluid through rotation of the impeller and discharges the fluid radially outward to obtain a pressure increase of the fluid by using the centrifugal force. Such a centrifugal compressor is provided with various features to meet the need to improve the pressure ratio and the efficiency in a broad operational range.

Generally, a centrifugal compressor is equipped with a scroll casing having a scroll part which forms a spiral scroll passage. The cross-section of the scroll passage (scroll cross-section) is formed in a near-circular shape over the entire circumference of the scroll passage. One known example of a conventional centrifugal compressor has a scroll cross-section that includes a first arc portion having a first curvature radius and a second arc portion having a second curvature radius different from the first curvature radius.

If the scroll cross-section is distorted, pressure loss may occur in the scroll passage. For this reason, the scroll cross-section is generally made closer to a perfect circle. One of the measures to make the scroll cross-section closer to a perfect circle is to form most of the scroll cross-section with the first arc portion and the rest of the scroll cross-section with the second arc portion. The second arc portion connects one end of the first arc portion and the tip-side passage surface of the diffuser passage. In this case, a dramatic change in curvature occurs between the first arc portion and the second arc portion, which may cause pressure loss in the scroll passage.

CITATION LIST

Patent Literature

Patent Document 1: JP6053993B

SUMMARY

Problems to be Solved

Another measure to make the scroll cross-section closer to a perfect circle is to reduce the difference between the first curvature radius and the second curvature radius so that the scroll cross-section has a shape close to a circle as a whole. In this case, since the change in curvature between the first arc portion and the second arc portion is gentle, the occurrence of pressure loss in the scroll passage can be suppressed as compared to the above-described measure, and the efficiency of the centrifugal compressor can be improved. To further improve the efficiency of the centrifugal compressor, it is required to suppress the occurrence of pressure loss in the scroll passage more effectively than this measure.

Incidentally, Patent Document 1 discloses a scroll part of a centrifugal compressor having a scroll cross-section that includes a first arc portion having a first curvature radius, a second arc portion having a second curvature radius, and a third arc portion having a third curvature radius. In the scroll part of Patent Document 1, the second arc portion has a flatter shape than the first arc portion and the third arc portion in order to make it easier to guide a fluid introduced into the scroll passage to the inner peripheral side of the scroll passage, as compared to the case where the cross-section of the scroll section has a near-circular shape. Thus, in the scroll part of Patent Document 1, the cross-section of the scroll passage is intentionally shaped different from a circular shape. Therefore, Patent Document 1 has low relevance to the present disclosure.

In view of the above, an object of at least one embodiment of the present disclosure is to provide a scroll casing and a centrifugal compressor including the scroll casing whereby it is possible to suppress the occurrence of pressure loss in the scroll passage.

Solution to the Problems

A scroll casing of a centrifugal compressor according to the present disclosure includes a scroll part forming a scroll passage of the centrifugal compressor. On an inner peripheral surface of the scroll part, when a connection position with a hub-side passage surface of a diffuser passage of the centrifugal compressor is defined as a first position, an outermost end in a radial direction of the centrifugal compressor is defined as a second position, a foremost end in an axial direction of the centrifugal compressor is defined as a third position, an innermost end in the radial direction is defined as a fourth position, and an end position on one-direction side which is a side from the first position toward the fourth position along the inner peripheral surface of the scroll part is defined as a fifth position, the scroll part has a near-circular scroll cross-section which includes at least a first arc portion extending from the first position to the one-direction side, a second arc portion formed on the one-direction side of the first arc portion so as to include at least a part of a region between the second position and the fourth position, and a third arc portion formed on the one-direction side of the second arc portion so as to include at least the fifth position, and satisfies a relationship of $R2>R3$, where $R2$ is a curvature radius of the second arc portion, and $R3$ is a curvature radius of the third arc portion.

A centrifugal compressor according to the present disclosure includes the above-described scroll casing.

Advantageous Effects

At least one embodiment of the present disclosure provides a scroll casing and a centrifugal compressor including the scroll casing whereby it is possible to suppress the occurrence of pressure loss in the scroll passage.

DETAILED DESCRIPTION

Figure 1:
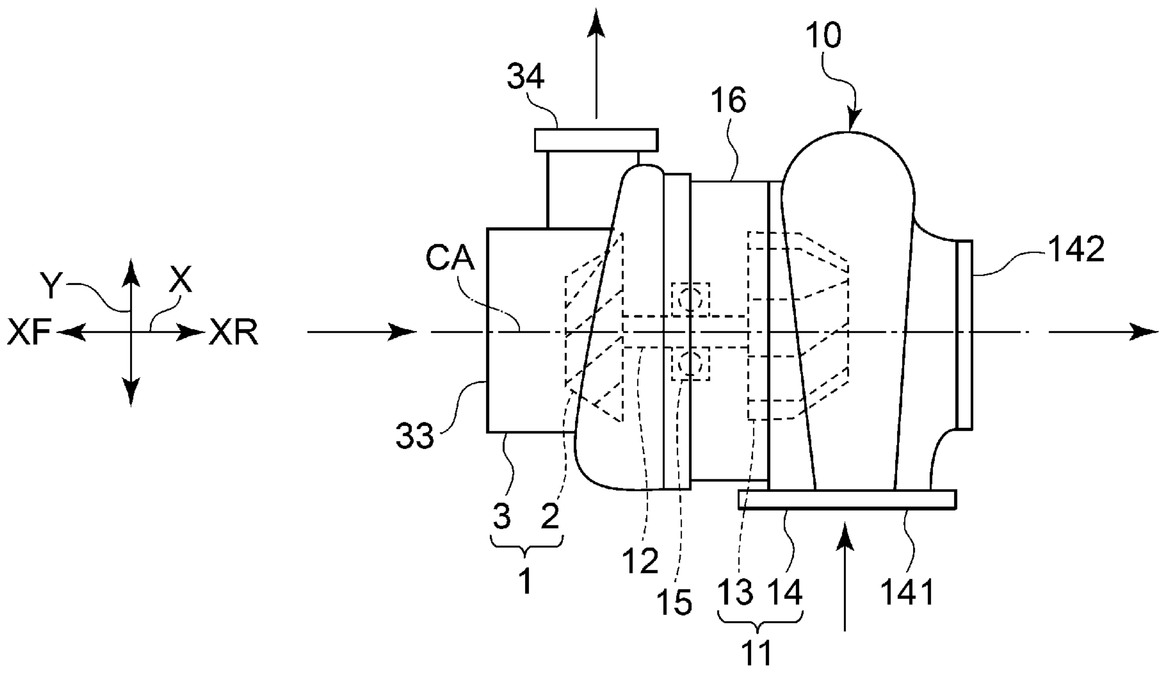
FIG. 1 is an explanatory diagram for describing the configuration of a turbocharger equipped with a centrifugal compressor according to an embodiment.

Embodiments of the present disclosure will be described below with reference to the accompanying drawings. It is intended, however, that unless particularly identified, dimensions, materials, shapes, relative positions, and the like of components described in the embodiments shall be interpreted as illustrative only and not intended to limit the scope of the present disclosure.

For instance, an expression of relative or absolute arrangement such as “in a direction”, “along a direction”, “parallel”, “orthogonal”, “centered”, “concentric” and “coaxial” shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as “same” “equal” and “uniform” shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as “comprise”, “include”, “have”, “contain” and “constitute” are not intended to be exclusive of other components.

The same features can be indicated by the same reference numerals and not described in detail.

(Centrifugal Compressor and Turbocharger)

Figure 2:
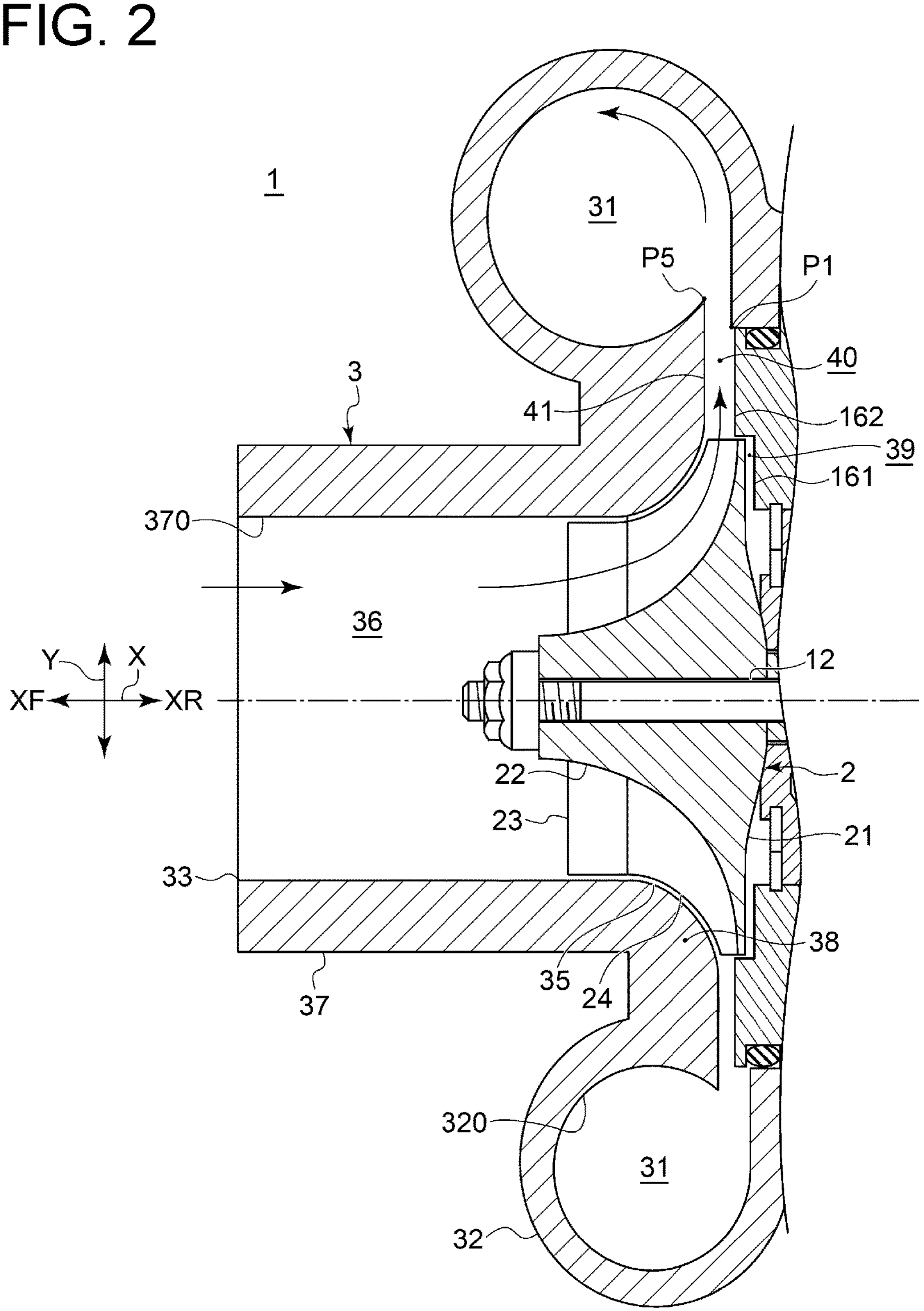
FIG. 2 is a schematic cross-sectional view of a compressor side of a turbocharger equipped with a centrifugal compressor according to an embodiment, in a cross-section including the axis of the centrifugal compressor.

FIG. 1 is an explanatory diagram for describing the configuration of a turbocharger equipped with a centrifugal compressor according to an embodiment. FIG. 2 is a schematic cross-sectional view of a compressor side of a turbocharger equipped with a centrifugal compressor according to an embodiment, in a cross-section including the axis of the centrifugal compressor.

As shown in FIGS. 1 and 2, a centrifugal compressor 1 according to some embodiments of the present disclosure includes an impeller 2 and a scroll casing 3. As shown in FIG. 2, the scroll casing 3 has at least a scroll part 32 which forms a spiral scroll passage 31 arranged around the impeller 2.

The centrifugal compressor 1 can be applied to, for example, turbochargers 10 for automobile, marine, or power generation use, other industrial centrifugal compressors, and blowers, etc. In the illustrated embodiment, the centrifugal compressor 1 is mounted in a turbocharger 10. As shown in FIG. 1, the turbocharger 10 includes the centrifugal compressor 1, a turbine 11, and a rotational shaft 12. The turbine 11 includes a turbine rotor 13 mechanically connected to the impeller 2 via the rotational shaft 12, and a turbine casing 14 rotatably accommodating the turbine rotor 13.

In the illustrated embodiment, as shown in FIG. 1, the turbocharger 10 further includes a bearing 15 rotatably supporting the rotational shaft 12 and a bearing casing 16 configured to accommodate the bearing 15. The bearing casing 16 is arranged between the scroll casing 3 and the turbine casing 14, and is mechanically connected to the scroll casing 3 and the turbine casing 14 by fastening members such as fastening bolts.

Hereinafter, for example as shown in FIG. 1, the direction in which the axis of the centrifugal compressor 1, i.e., the axis CA of the impeller 2 extends is referred to as the axial direction X, and the direction perpendicular to the axis CA is referred to as the radial direction Y. In the axial direction X, the upstream side with respect to the intake direction of the centrifugal compressor 1, i.e., the side where a fluid introduction port 33 is positioned with respect to the impeller 2 (left side in the figure) is referred to as the front side XF. Further, in the axial direction X, the downstream side with respect to the intake direction of the centrifugal compressor 1, i.e., the side where the impeller 2 is positioned with respect to the fluid introduction port 33 (right side in the figure) is referred to as the rear side XR.

In the illustrated embodiment, as shown in FIG. 1, the scroll casing 3 has a fluid introduction port 33 for introducing a fluid (e.g., air) from the outside of the scroll casing 3, and a fluid discharge port 34 for discharging the fluid that has passed through the impeller 2 and the scroll passage 31 to the outside of the scroll casing 3. The turbine casing 14 has an exhaust gas introduction port 141 for introducing an exhaust gas into the turbine casing 14, and an exhaust gas discharge port 142 for discharging the exhaust gas that has passed through the turbine rotor 13 to the outside of the turbine casing 14.

As shown in FIG. 1, the rotational shaft 12 has a longitudinal direction along the axial direction X. The rotational shaft 12 is mechanically connected at one end (front side XF) in the longitudinal direction to the impeller 2, and is mechanically connected at the other end (rear side XR) in the longitudinal direction to the turbine rotor 13. The expression “along a certain direction” in the present disclosure includes not only the certain direction but also a direction inclined with respect to the certain direction.

The turbocharger 10 rotates the turbine rotor 13 by the exhaust gas introduced from an exhaust gas generation device (not shown, e.g., internal combustion engine such as engine) into the turbine casing 14 through the exhaust gas introduction port 141. Since the impeller 2 is mechanically connected to the turbine rotor 13 via the rotational shaft 12, the impeller 2 rotates in conjunction with the rotation of the turbine rotor 13. By rotating the impeller 2, the turbocharger 10 compresses the fluid introduced into the scroll casing 3 through the fluid introduction port 33 and sends it to a supply destination (e.g., internal combustion engine such as engine) through the fluid discharge port 34.

(Impeller)

As shown in FIG. 2, the impeller 2 includes a hub 21 and a plurality of impeller blades 23 disposed on an outer surface 22 of the hub 21. Since the hub 21 is mechanically fixed to one side of the rotational shaft 12, the hub 21 and the plurality of impeller blades 23 can rotate in conjunction with the rotational shaft 12 about the axis CA of the impeller 2. The impeller 2 is configured to guide the fluid introduced from the front side XF in the axial direction X to the outer side in the radial direction Y. In the illustrated embodiment, the impeller blades 23 are arranged at intervals in the circumferential direction about the axis CA. A gap (clearance) is formed between tip-side edges 24 of the impeller blades 23 and a shroud surface 35 convexly curved so as to face the tip-side edges 24.

(Scroll Casing)

In the illustrated embodiment, as shown in FIG. 2, the scroll casing 3 includes an intake passage part 37 which forms an intake passage 36 for introducing a fluid from the outside of the scroll casing 3 to the impeller 2, a shroud part 38 having the shroud surface 35, and the above-described scroll part 32 which forms the scroll passage 31 for introducing the fluid having passed through the impeller 2 to the outside of the scroll casing 3. The scroll passage 31 and the intake passage 36 are formed inside the scroll casing 3.

The intake passage part 37 has an inner wall surface 370 forming the intake passage 36. The inner wall surface 370 extends along the axial direction X, and the fluid introduction port 33 is formed at the end on the front side XF. The scroll part 32 has an inner peripheral surface 320 forming the scroll passage 31.

Further, in the illustrate embodiment, as shown in FIG. 2, the scroll casing 3 is combined with another member (e.g., bearing casing 16) to form an impeller chamber 39 which is a space for rotatably accommodating the impeller 2, and a diffuser passage 40 for guiding the fluid from the impeller 2 to the scroll passage 31.

The shroud part 38 is disposed between the intake passage part 37 and the scroll part 32. The shroud surface 35 of the shroud part 38 forms a portion of the impeller chamber 39 on the front side XF. Further, the shroud part 38 has a tip-side passage surface 41 forming a portion of the diffuser passage 40 on the front side XF and connecting the shroud surface 35 and one end of the inner peripheral surface 320 of the scroll part 32. In the illustrated embodiment, the bearing casing 16 has an impeller chamber forming surface 161 disposed on the rear side XR of the shroud surface 35 and forming a portion of the impeller chamber 39 on the rear side XR, and a hub-side passage surface 162 disposed on the rear side XR of the tip-side passage surface 41 so as to face the tip-side passage surface 41 and connecting the impeller chamber forming surface 161 and the other end (first position P1 which will be described later) of the inner peripheral surface 320 of the scroll part 32. In a cross-section along the axis CA as shown in FIG. 2, the tip-side passage surface 41 and the hub-side passage surface 162 extend along a direction intersecting (in the illustrated example, perpendicular to) the axis CA.

The fluid introduced into the scroll casing 3 flows through the intake passage 36 to the rear side XR and then is sent to the impeller 2. The fluid sent to the impeller 2 flows through the diffuser passage 40 and the scroll passage 31 in this order, and then is discharged to the outside of the scroll casing 3 through the fluid discharge port 34.

(Scroll Cross-Section)

Figure 3:
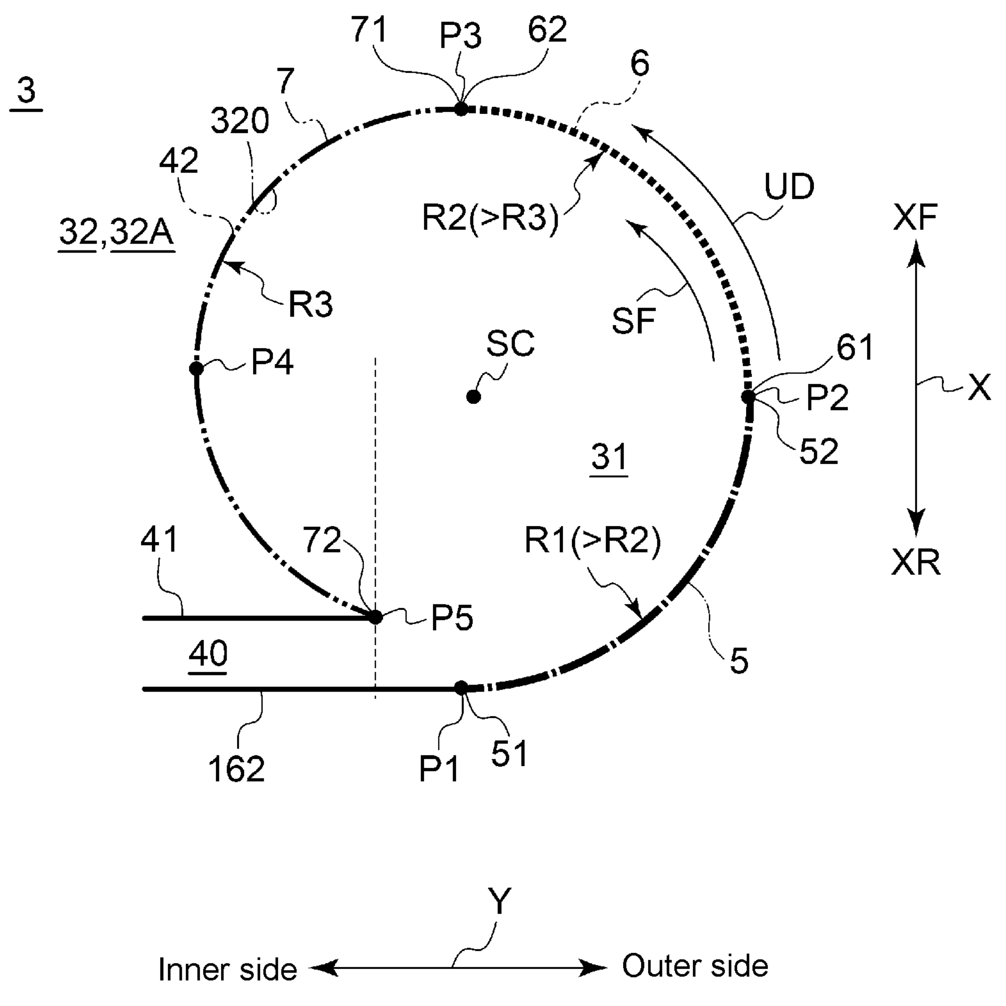
FIG. 3 is an explanatory diagram for describing the shape of a scroll part of a scroll casing according to an embodiment.
Figure 4:
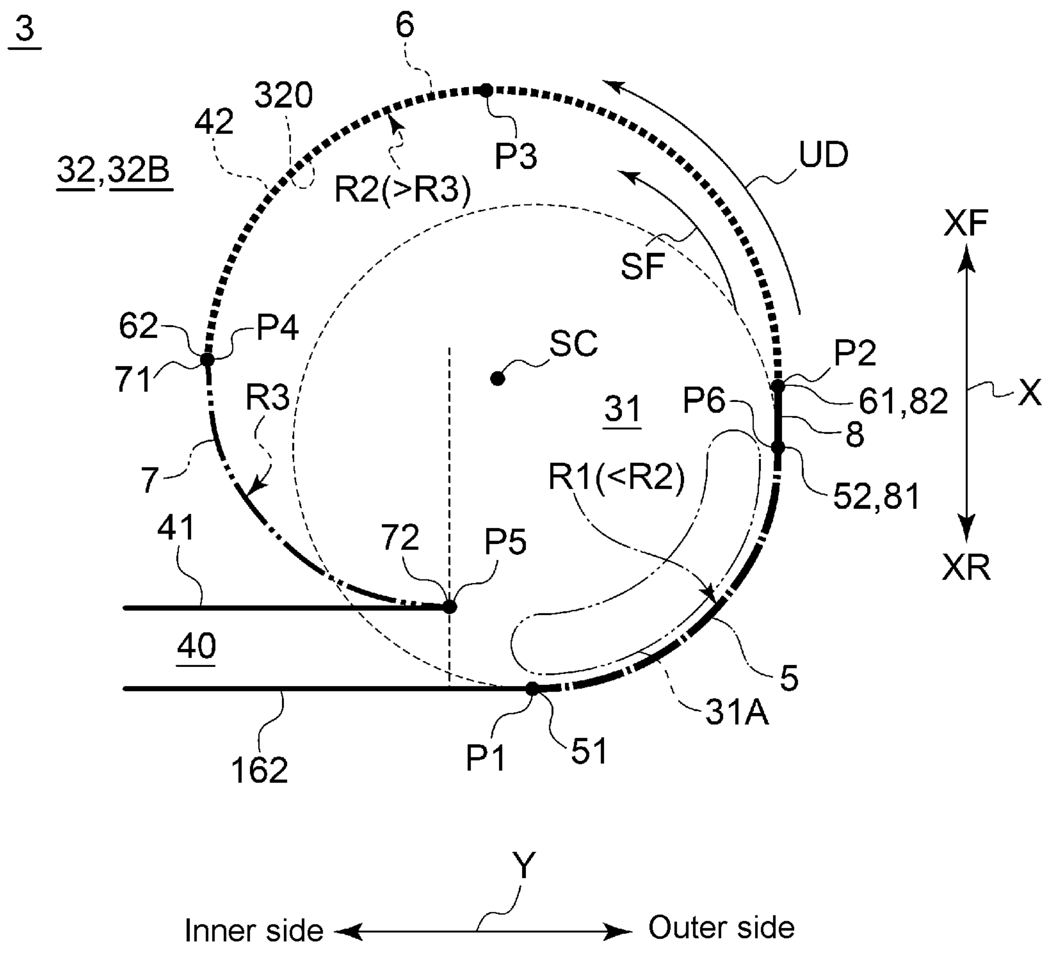
FIG. 4 is an explanatory diagram for describing the shape of a scroll part of a scroll casing according to an embodiment.

FIGS. 3 and 4 are each an explanatory diagram for describing the shape of the scroll part of the scroll casing according to an embodiment. FIGS. 3 and 4 schematically show a cross-section of the scroll casing 3 taken along the axis CA.

Hereinafter, as shown in FIGS. 3 and 4, on the inner peripheral surface 320 of the scroll part 32, a connection position with the hub-side passage surface 162 of the diffuser passage 40 of the centrifugal compressor 1 is defined as a first position P1, an outermost end in the radial direction Y of the centrifugal compressor 1 is defined as a second position P2, a foremost end in the axial direction X of the centrifugal compressor 1 is defined as a third position P3, an innermost end in the radial direction Y is defined as a fourth position P4, and an end position on an one-direction UD side which is a side from the first position P1 toward the fourth position P4 along the inner peripheral surface 320 of the scroll part 32 is defined as a fifth position P5. The first position P1 is the rear end of the inner peripheral surface 320 in the axial direction X, where the curvature radius changes from infinite (straight line) to finite. Further, the one-direction UD is a counterclockwise direction centered on the center SC of the scroll passage 31 in the cross-section along the axis CA of the scroll casing 3, and the one-direction UD side is the downstream side in this direction.

As shown in FIGS. 3 and 4, the scroll casing 3 according to some embodiments has the scroll part 32 (32A, 32B) which forms the scroll passage 31 of the centrifugal compressor 1. As shown in FIGS. 3 and 4, the scroll part 32 (32A, 32B) has a near-circular scroll cross-section 42 including at least a first arc portion 5 extending from the first position P1 to the one-direction UD side, a second arc portion 6 formed on the one-direction UD side of the first arc portion 5, and a third arc portion 7 formed on the one-direction UD side of the second arc portion 6. The second arc portion 6 is formed so as to include at least a part of the region between the second position P2 and the fourth position P4. The third arc portion 7 is formed so as to include at least the fifth position P5. In FIGS. 3 and 4, the first arc portion 5 is represented by the dotted and dashed line, the second arc portion 6 by the dotted line, and the third arc portion 7 by the double-dotted and dashed line.

The curvature radius of the first arc portion 5 is defined as R1, the curvature radius of the second arc portion 6 is defined as R2, and the curvature radius of the third arc portion 7 is defined as R3. In the embodiments shown in FIGS. 3 and 4, each of the first arc portion 5, the second arc portion 6, and the third arc portion 7 is formed to have a constant curvature radius R1 to R3 from the upstream end to the downstream end.

As shown in FIGS. 3 and 4, preferably, the first arc portion 5 is smoothly connected to the hub-side passage surface 162 and the second arc portion 6. Further, preferably, the third arc portion 7 is smoothly connected to the second arc portion 6. Further, the near-circular scroll cross-section 42 preferably has a shape close to a perfect circle.

Hereinafter, the upstream end in the one-direction UD may simply be referred to as “upstream end”, and the downstream end in the one-direction UD may simply be referred to as “downstream end”.

In the embodiment shown in FIG. 3, the first arc portion 5 of the scroll part 32 (32A) extends from the first position P1 to the second position P2 on the inner peripheral surface 320. The second arc portion 6 extends from the second position P2 to the third position P3 on the inner peripheral surface 320. The third arc portion 7 extends from the third position P3 to the fifth position P5 on the inner peripheral surface 320.

The upstream end 51 of the first arc portion 5 of the scroll part 32 (32A) is connected to the hub-side passage surface 162 at the first position P1, and the downstream end 52 thereof is connected to the upstream end 61 of the second arc portion 6 at the second position P2. The upstream end 71 of the third arc portion 7 is connected to the downstream end 62 of the second arc portion 6 at the third position P3, and the downstream end 72 thereof is at the fifth position P5.

In the embodiment shown in FIG. 4, the near-circular scroll cross-section 42 of the scroll part 32 (32B) further includes a first straight portion 8 connecting the first arc portion 5 and the second arc portion 6. The first straight portion 8 extends along the axial direction X. The first arc portion 5 of the scroll part 32 (32B) extends from the first position P1 to a position P6 upstream of the second position P2 in the one-direction UD on the inner peripheral surface 320. The second arc portion 6 extends from the second position P2 to the fourth position P4 on the inner peripheral surface 320. The third arc portion 7 extends from the fourth position P4 to the fifth position P5 on the inner peripheral surface 320.

The upstream end 51 of the first arc portion 5 of the scroll part 32 (32B) is connected to the hub-side passage surface 162 at the first position P1, and the downstream end 52 thereof is connected to the upstream end (rear end) 81 of the first straight portion 8 at the position P6 upstream of the second position P2 in the one-direction UD. The upstream end 61 of the second arc portion 6 is connected to the downstream end (front end) of the first straight portion 8 at the second position P2, and the downstream end 62 thereof is connected to the upstream end 71 of the third arc portion 7 at the fourth position P4. The downstream end 72 of the third arc portion 7 is at the fifth position P5.

In some embodiments, the near-circular scroll cross-section 42 of the scroll part 32 (32A, 32B) may further include a second straight portion (not shown) connecting the second arc portion 6 and the third arc portion 7.

Figure 5:
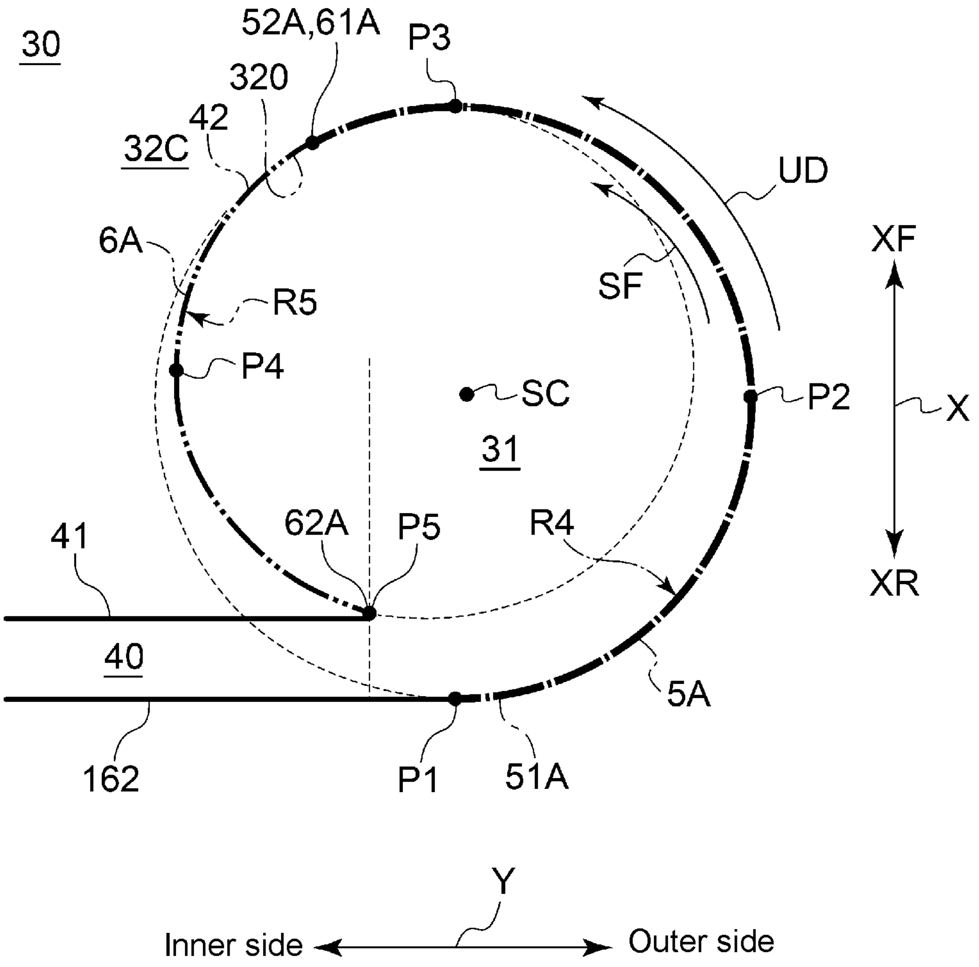
FIG. 5 is an explanatory diagram for describing the shape of a scroll part of a scroll casing according to a comparative example.
Figure 6:
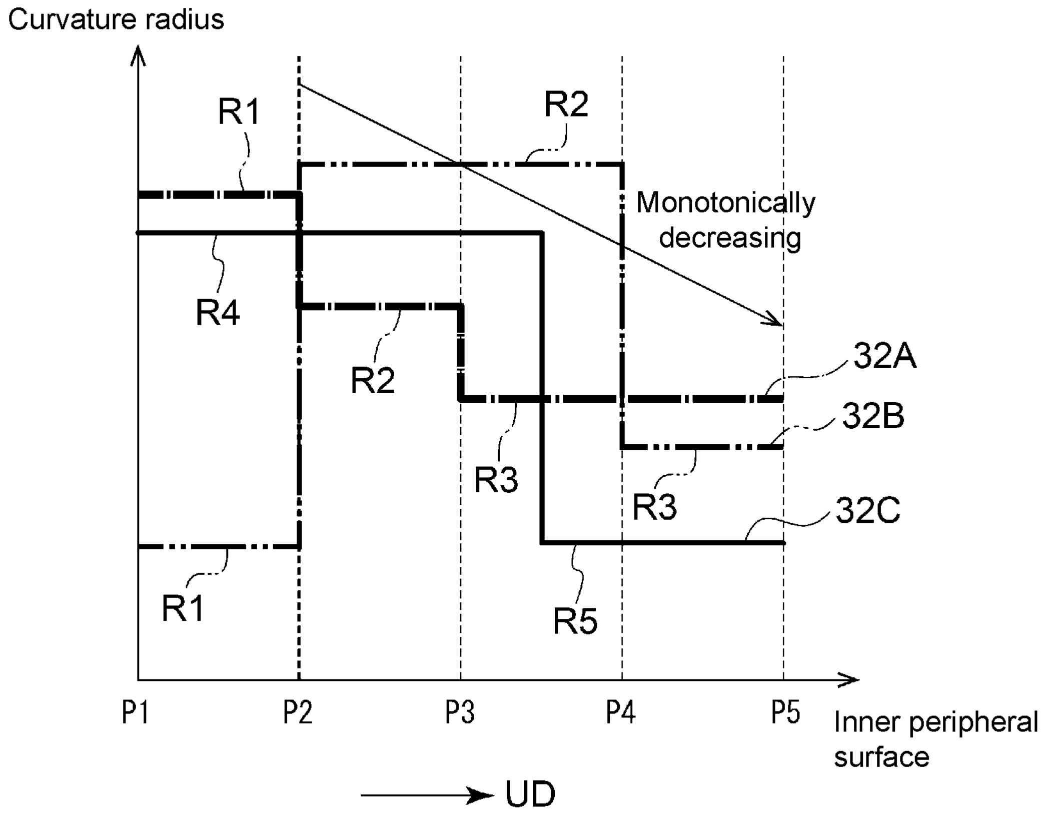
FIG. 6 is a comparison diagram for comparing the shape of the scroll part according to the embodiment shown in FIGS. 3 and 4 with the shape of the scroll part according to the comparative example shown in FIG. 5.

FIG. 5 is an explanatory diagram for describing the shape of a scroll part of a scroll casing according to a comparative example. FIG. 6 is a comparison diagram for comparing the shape of the scroll part according to the embodiment shown in FIGS. 3 and 4 with the shape of the scroll part according to the comparative example shown in FIG. 5. FIG. 6 shows the relationship between the curvature radius and the position on the inner peripheral surface 320 of the scroll part 32 (32A, 32B, 32C).

As shown in FIG. 5, the scroll casing 30 according to the comparative example has a scroll part 32C which forms the scroll passage 31. The scroll part 32C has a near-circular scroll cross-section 42A including a first arc portion 5A extending from the first position P1 to the one-direction UD side, and a second arc portion 6A formed on the one-direction UD side of the first arc portion 5A so as to include at least the fifth position P5. The curvature radius of the first arc portion 5A is defined as R4, and the curvature radius of the second arc portion 6A is defined as R5. Each of the first arc portion 5A and the second arc portion 6A is formed to have a constant curvature radius R4, R5 from the upstream end to the downstream end. In FIG. 5, the first arc portion 5A is represented by the dotted and dashed line, and the second arc portion 6A by the double-dotted and dashed line.

The upstream end 51A of the first arc portion 5A is connected to the hub-side passage surface 162 at the first position P1, and the downstream end 52A thereof is connected to the upstream end 61A of the second arc portion 6A. The downstream end 62A of the second arc portion 6A is at the fifth position P5.

As shown in FIG. 6, the near-circular scroll cross-section 42 of the scroll part 32 (32A, 32B) includes three arc portions (first arc portion 5, second arc portion 6, and third arc portion 7). In this case, the difference in curvature radius between the arc portions can be reduced on the one-direction UD side from the second position P2, as compared to the near-circular scroll cross-section 42A (comparative example) including two arc portions (first arc portion 5A and second arc portion 6A). For example, the difference in curvature radius between the second arc portion 6 and the third arc portion 7 of the scroll part 32 (32A, 32B) can be made smaller than the difference in curvature radius between the first arc portion 5A and the second arc portion 6A of the scroll part 32C according to the comparative example.

For example, as shown in FIG. 3, the fluid flowing from the diffuser passage 40 into the scroll passage 31 has a swirl velocity component, which forms a swirling flow SF flowing to the one-direction UD side along the inner peripheral surface 320 on the one-direction UD side of the second position P2. When the difference in curvature radius between the arc portions is reduced on the one-direction UD side of the second position P2 to reduce the curvature change amount of the inner peripheral surface 320, the pressure loss of the swirling flow SF in the scroll passage 31 can be suppressed. During the high flow rate operation of the centrifugal compressor 1, the swirl velocity component of the swirling flow SF is increased, so that the degree of pressure loss of the swirling flow SF in the scroll passage 31 is increased. In contrast, by reducing the curvature change amount of the inner peripheral surface 320, high pressure loss reduction effect can be obtained. Thus, the efficiency of the centrifugal compressor 1 during the high flow rate operation can be effectively improved.

According to the above configuration, the scroll part 32 (32A, 32B) has the near-circular scroll cross-section 42 that includes the first arc portion 5 including at least the first position P1, the second arc portion 6 formed on the one-direction UD side of the first arc portion 5 so as to include at least a part of the region between the second position P2 and the fourth position P4, and the third arc portion 7 formed on the one-direction UD side of the second arc portion 6 so as to include at least the fifth position P5. In this case, since the near-circular scroll cross-section 42 includes three arc portions (first arc portion 5, second arc portion 6, and third arc portion 7), as compared to the case where the cross-section includes two arc portions (e.g., first arc portion 5A and second arc portion 6A), the difference in curvature radius between the arc portions can be reduced. As a result, it is possible to effectively suppress the occurrence of pressure loss due to a sudden change in curvature from the first arc portion 5 to the third arc portion 7 of the near-circular scroll cross-section 42.

In some embodiments, as shown in FIG. 6, the inner peripheral surface 320 of the above-described scroll part 32 (32A, 32B) is formed so that the curvature radius of the inner peripheral surface 320 decreases monotonically toward the one-direction UD side, at least in the range from the second position P2 to the fifth position P5 (preferably, in the range from the first position P1 to the fifth position P5). In this case, since the change in curvature in the near-circular scroll cross-section 42 can be made gentle, it is possible to suppress the occurrence of pressure loss due to a sudden change in curvature in the scroll passage 31.

In some embodiments, as shown in FIGS. 3, 4, and 6, the near-circular scroll cross-section 42 of the above-described scroll part 32 (32A, 32B) satisfies a relationship of R2>R3. When the curvature radius R2 of the second arc portion 6 is larger than the curvature radius R3 of the third arc portion 7, the change in curvature between the second arc portion 6 and the third arc portion 7 in the near-circular scroll cross-section 42 can be made gentle. When the change in curvature between the second arc portion 6 and the third arc portion 7 is gentle, it is possible to suppress the occurrence of pressure loss due to a sudden change in curvature between the second arc portion 6 and the third arc portion 7. Further, according to the above configuration, the curvature radius of the inner peripheral surface 320 can be monotonically decreased toward the one-direction UD side in the range from the second position P2 to the fifth position P5 on the inner peripheral surface 320.

In some embodiments, as shown in FIGS. 3 and 6, the near-circular scroll cross-section 42 of the above-described scroll part 32 (32A) satisfies a relationship of R1>R2. When the curvature radius R1 of the first arc portion 5 is larger than the curvature radius R2 of the second arc portion 6, the change in curvature between the first arc portion 5 and the second arc portion 6 in the near-circular scroll cross-section 42 can be made gentle. As a result, it is possible to effectively suppress the occurrence of pressure loss due to a sudden change in curvature from the first arc portion 5 and the second arc portion 6. Further, according to the above configuration, the curvature radius of the inner peripheral surface 320 can be monotonically decreased toward the one-direction UD side in the range from the first position P1 to the fifth position P5 on the inner peripheral surface 320.

In some embodiments, as shown in FIGS. 4 and 6, the near-circular scroll cross-section 42 of the above-described scroll part 32 (32B) satisfies a relationship of R2>R1. When the curvature radius R1 of the first arc portion 5 is smaller than the curvature radius R2 of the second arc portion 6, the distance of the outermost end (second position P2) of the scroll passage 31 in the radial direction from the axis CA of the centrifugal compressor 1 can be shortened. This makes it possible to downsize the scroll casing 30 and thus the centrifugal compressor 1. Further, a region 31A of the scroll passage 31 facing the first arc portion 5 is a region where the flow from the diffuser passage 40 enters, and the swirling flow SF is formed on the downstream side (one-direction UD side) of the region 31A in the scroll passage 31. Therefore, even when the curvature radius R1 of the first arc portion 5 is smaller than the curvature radius R2 of the second arc portion 6, by suppressing the occurrence of pressure loss on the downstream side of the region 31A, it is possible to sufficiently suppress the occurrence of pressure loss in the scroll passage. The curvature radius R1 of the first arc portion 5 may be smaller than the curvature radius R3 of the third arc portion 7.

In some embodiments, as shown in FIG. 4, the near-circular scroll cross-section 42 of the above-described scroll part 32 (32B) satisfies a relationship of R2>R1. Further, the above-described near-circular scroll cross-section 42 further includes a first straight portion 8 connecting the first arc portion 5 and the second arc portion 6.

When the distance of the outermost end (second position P2) of the scroll passage 31 in the radial direction from the axis CA of the centrifugal compressor 1 is shortened, it may be difficult to directly connect the first arc portion 5 and the second arc portion 6. According to the above configuration, with the first straight portion 8 connecting the first arc portion 5 and the second arc portion 6, the shape in which the first arc portion 5 and the second arc portion 6 are connected can be easily obtained. The first straight portion 8 is preferably as short as possible because the pressure loss in the scroll passage 31 may increase when the first straight portion 8 is long.

Figure 7:
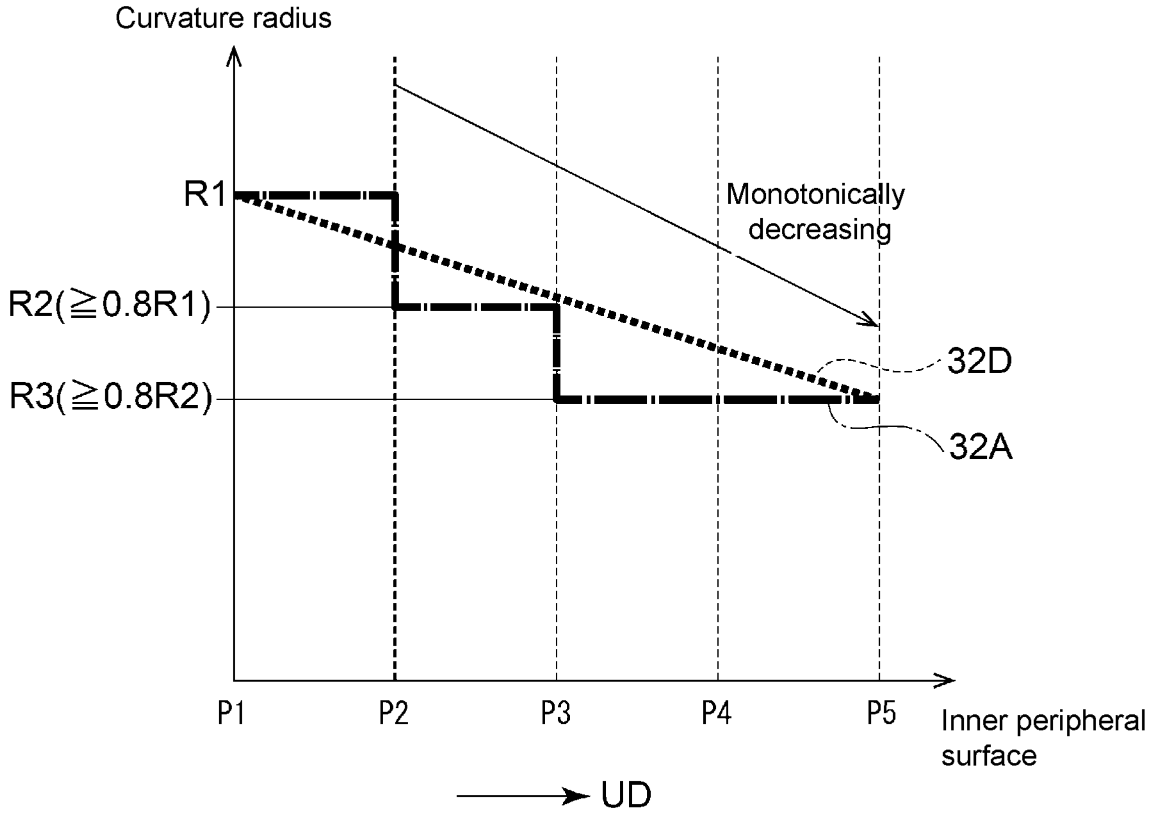
FIG. 7 is an explanatory diagram for describing the shape of a scroll part of a scroll casing according to an embodiment.

FIG. 7 is an explanatory diagram for describing the shape of the scroll part of the scroll casing according to an embodiment. FIG. 7 shows the relationship between the curvature radius and the position on the inner peripheral surface 320 of the scroll part 32 (32A). FIG. 7 also shows a scroll part 32D including an infinite number of arc portions configured so that the curvature of the inner peripheral surface 320 continuously decreases toward the one-direction UD side.

In some embodiments, as shown in FIG. 7, the near-circular scroll cross-section 42 of the above-described scroll part 32 (32A) satisfies a relationship of R2/R1≥0.8 and R3/R2≥0.8. Preferably, the near-circular scroll cross-section 42 satisfies a relationship of R2/R1≥0.9 and R3/R2≥0.9.

According to the above configuration, the near-circular scroll cross-section 42 satisfies a relationship of R2/R1≥0.8. In other words, the curvature radius R2 of the second arc portion 6 has a curvature radius reduction ratio of 20% or less with respect to the curvature radius R1 of the first arc portion 5. When the curvature change amount between the first arc portion 5 and the second arc portion 6 is small, it is possible to effectively suppress the occurrence of pressure loss due to a sudden change in curvature between the first arc portion 5 and the second arc portion 6. Further, the near-circular scroll cross-section 42 satisfies a relationship of R3/R2≥0.8. In other words, the curvature radius R3 of the third arc portion 7 has a curvature radius reduction ratio of 20% or less with respect to the curvature radius R2 of the second arc portion 6. When the curvature change amount between the second arc portion 6 and the third arc portion 7 is small, it is possible to effectively suppress the occurrence of pressure loss due to a sudden change in curvature between the second arc portion 6 and the third arc portion 7.

In particular, when the near-circular scroll cross-section 42 satisfies a relationship of R2/R1≥0.9 and R3/R2≥0.9, the effect of reducing pressure loss is almost comparable to the case where the curvature of the inner peripheral surface 320 in the near-circular scroll cross-section 42 continuously decreases toward the one-direction UD side (scroll part 32D).

Figure 8:
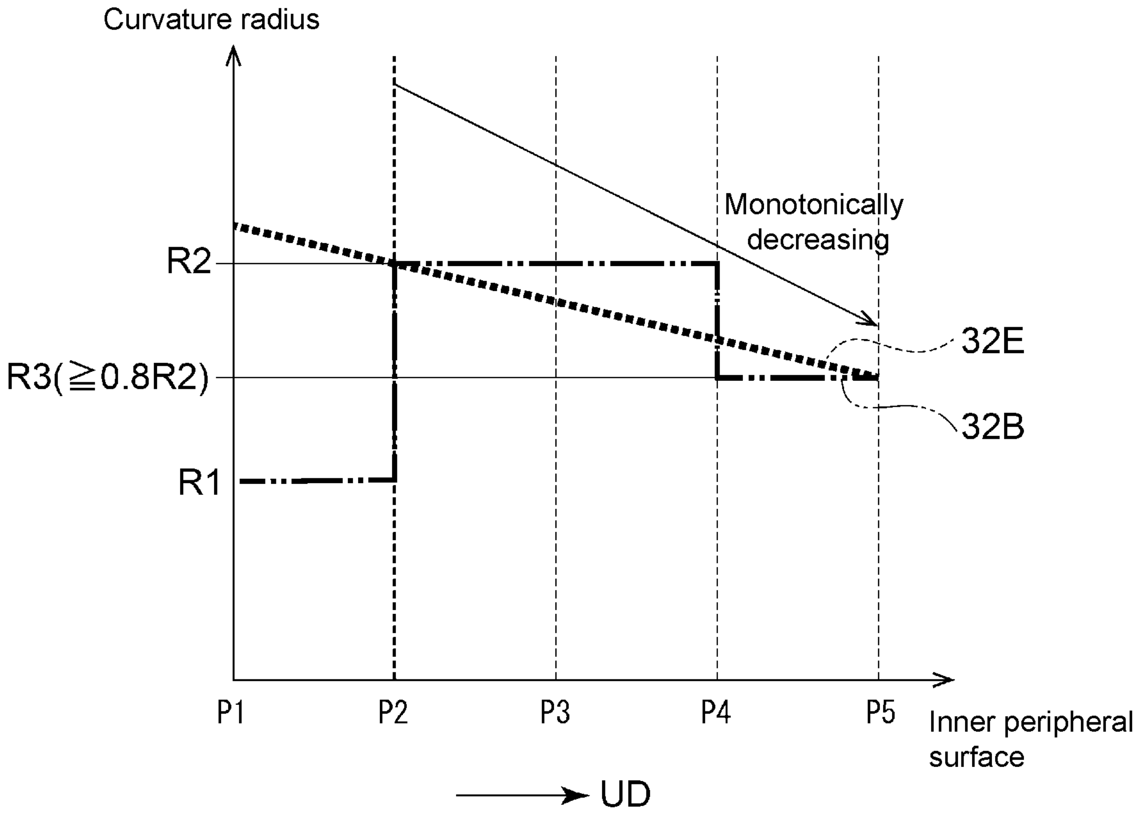
FIG. 8 is an explanatory diagram for describing the shape of a scroll part of a scroll casing according to an embodiment.

FIG. 8 is an explanatory diagram for describing the shape of the scroll part of the scroll casing according to an embodiment. FIG. 8 shows the relationship between the curvature radius and the position on the inner peripheral surface 320 of the scroll part 32 (32B). FIG. 8 also shows a reduced scroll part 32E including an infinite number of arc portions configured so that the curvature of the inner peripheral surface 320 continuously decreases toward the one-direction UD side.

In some embodiments, as shown in FIG. 8, the near-circular scroll cross-section 42 of the above-described scroll part 32 (32B) satisfies a relationship of R3/R2≥0.8. The near-circular scroll cross-section 42 preferably satisfies R3/R2≥0.9.

According to the above configuration, the near-circular scroll cross-section 42 satisfies a relationship of R3/R2≥0.8. In other words, the curvature radius R3 of the third arc portion 7 has a curvature radius reduction ratio of 20% or less with respect to the curvature radius R2 of the second arc portion 6. When the curvature change amount between the second arc portion 6 and the third arc portion 7 is small, it is possible to effectively suppress the occurrence of pressure loss due to a sudden change in curvature between the second arc portion 6 and the third arc portion 7.

In particular, when the near-circular scroll cross-section 42 satisfies a relationship of R3/R2≥0.9, the effect of reducing pressure loss is almost comparable to the case where the curvature of the inner peripheral surface 320 in the near-circular scroll cross-section 42 continuously decreases toward the one-direction UD side (scroll part 32E).

In the above-described embodiments, the near-circular scroll cross-section 42 includes three arc portions (first arc portion 5, second arc portion 6, and third arc portion 7) each having a constant curvature radius. However, in some embodiments, as shown in FIGS. 7 and 8, the near-circular scroll cross-section 42 may be formed so that the curvature of the inner peripheral surface 320 decreases monotonically toward the one-direction UD side, at least in the range from the second position P2 to the fifth position P5 (preferably, in the range from the first position P1 to the fifth position P5) on the inner peripheral surface 320. In this case, the pressure loss in the scroll passage 31 can be effectively suppressed, but it is difficult to form the shape of the inner peripheral surface 320, which may lead to an increase in the manufacturing cost of the scroll casing 3. In contrast, in the case of the above-described near-circular scroll cross-section 42 including three arc portions, the shape of the inner peripheral surface 320 can be easily formed, and an increase in the manufacturing cost of the scroll casing 3 can be suppressed.

Figure 9:
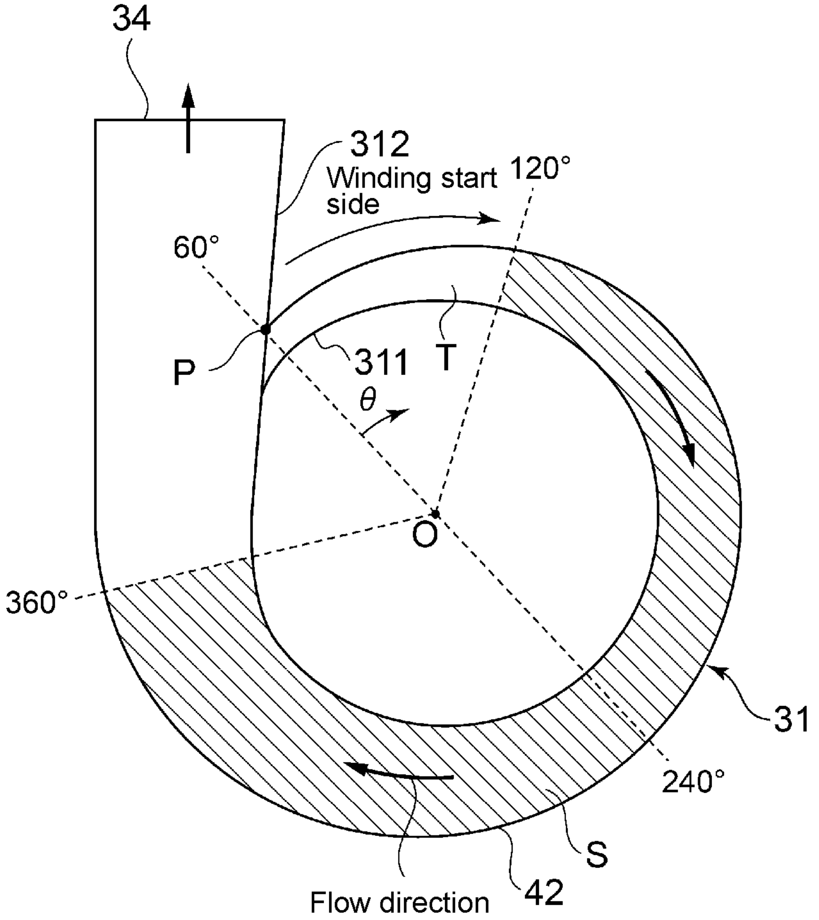
FIG. 9 is a schematic diagram of the scroll passage when the centrifugal compressor according to an embodiment is viewed in the axial direction.

FIG. 9 is a schematic diagram of the scroll passage when the centrifugal compressor according to an embodiment is viewed in the axial direction.

As shown in FIG. 9, with respect to an angular position θ about the scroll center O of the scroll passage 31, the joint position between the winding start 311 and the winding end 312 of the scroll passage 31 is defined as 60 degrees, and the angular position θ is defined such that the angle gradually increases from the joint position downstream (clockwise about the scroll center O in the figure) in the scroll passage 31.

In some embodiments, as shown in FIG. 9, the above-described near-circular scroll cross-section 42 is formed in a range S where the angular position θ is from 120 degrees to 360 degrees.

The scroll passage 31 has a smaller scroll cross-sectional area as it is closer to the winding start. Therefore, it may be difficult to form the near-circular scroll cross-section 42 in the vicinity of the winding start. According to the above configuration, since the near-circular scroll cross-section 42 is formed in the range S where the angular position θ is from 120 degrees to 360 degrees, which is easy to form the near-circular scroll cross-section 42, the occurrence of pressure loss in the scroll passage 31 can be sufficiently suppressed. The near-circular scroll cross-section 42 may be formed in a range T where the angular position θ is from 0 degrees to 120 degrees. The near-circular scroll cross-section 42 is preferably formed in the range S and the range T.

In some embodiments, as shown in FIG. 3, the third arc portion 7 of the scroll part 32 is formed so as to include at least the third position P3, the fourth position P4, and the fifth position P5. In the illustrated embodiment, the third arc portion 7 extends from the third position P3 to the fifth position P5, and the curvature radius R3 is constant. According to the above configuration, since the third arc portion 7 includes the third position P3, the fourth position P4, and the fifth position P5, the near-circular scroll cross-section 42 can have a gentle change in curvature in the range from the third position P3 to the fifth position P5, which is important for determining the swirling state of the swirling flow SF formed in the scroll cross-section 42. Thus, it is possible to effectively suppress the occurrence of pressure loss due to a sudden change in curvature in the above-described range. In particular, when the curvature radius R3 is constant in the range from the third position P3 to the fifth position P5, it is possible to more effectively suppress the occurrence of pressure loss due to a sudden change in curvature in the above-described range.

As shown in FIG. 2, the centrifugal compressor 1 according to some embodiments includes the above-described scroll casing 3. In this case, the occurrence of pressure loss in the scroll passage 31 can be suppressed, so that the efficiency of the centrifugal compressor 1 can be improved. In particular, the efficiency of the centrifugal compressor 1 can be effectively improved during the high flow rate operation.

The present disclosure is not limited to the embodiments described above, but includes modifications to the embodiments described above, and embodiments composed of combinations of those embodiments.

The contents described in the above embodiments would be understood as follows, for instance.

1) A scroll casing (3) of a centrifugal compressor (1) according to at least one embodiment of the present disclosure includes a scroll part (32) forming a scroll passage (31) of the centrifugal compressor. On an inner peripheral surface (320) of the scroll part, when a connection position with a hub-side passage surface (162) of a diffuser passage (40) of the centrifugal compressor is defined as a first position (P1), an outermost end in a radial direction of the centrifugal compressor is defined as a second position (P2), a foremost end in an axial direction of the centrifugal compressor is defined as a third position (P3), an innermost end in the radial direction is defined as a fourth position (P4), and an end position on one-direction (UD) side which is a side from the first position (P1) toward the fourth position (P4) along the inner peripheral surface of the scroll part is defined as a fifth position (P5), the scroll part (32) has a near-circular scroll cross-section (42) which includes at least a first arc portion (5) extending from the first position (P1) to the one-direction side, a second arc portion (6) formed on the one-direction side of the first arc portion (5) so as to include at least a part of a region between the second position (P2) and the fourth position (P4), and a third arc portion (7) formed on the one-direction side of the second arc portion (6) so as to include at least the fifth position (P5), and satisfies a relationship of R2>R3, where R2 is a curvature radius of the second arc portion (6), and R3 is a curvature radius of the third arc portion (7).

According to the above configuration 1), the scroll part (32) has the near-circular scroll cross-section (42) that includes the first arc portion (5) including at least the first position (P1), the second arc portion (6) formed on the one-direction (UD) side of the first arc portion (5) so as to include at least a part of the region between the second position (P2) and the fourth position (P4), and the third arc portion (7) formed on the one-direction side of the second arc portion (6) so as to include at least the fifth position (P5). In this case, since the near-circular scroll cross-section (42) includes three arc portions (first arc portion 5, second arc portion 6, and third arc portion 7), as compared to the case where the cross-section includes two arc portions, the difference in curvature radius between the arc portions can be reduced. As a result, it is possible to effectively suppress the occurrence of pressure loss due to a sudden change in curvature from the first arc portion (5) to the third arc portion (7) of the near-circular scroll cross-section (42).

Additionally, according to the above configuration 1), the curvature radius R2 of the second arc portion (6) is larger than the curvature radius R3 of the third arc portion (7). In this case, the change in curvature between the second arc portion (6) and the third arc portion (7) in the near-circular scroll cross-section (42) can be made gentle. When the change in curvature between the second arc portion (6) and the third arc portion (7) is gentle, it is possible to suppress the occurrence of pressure loss due to a sudden change in curvature between the second arc portion (6) and the third arc portion (7).

2) In some embodiments, in the scroll casing (3) described in 1), the near-circular scroll cross-section (42) satisfies a relationship of R1>R2, where R1 is a curvature radius of the first arc portion (5).

According to the above configuration 2), in the near-circular scroll cross-section (42), the curvature radius R1 of the first arc portion (5) is larger than the curvature radius R2 of the second arc portion (6). In this case, the change in curvature between the first arc portion (5) and the second arc portion (6) in the near-circular scroll cross-section (42) can be made gentle. As a result, it is possible to effectively suppress the occurrence of pressure loss due to a sudden change in curvature from the first arc portion (5) and the second arc portion (6).

3) In some embodiments, in the scroll casing (3) described in 1), the near-circular scroll cross-section (42) satisfies a relationship of R2>R1, where R1 is a curvature radius of the first arc portion (5).

According to the above configuration 3), in the near-circular scroll cross-section (42), the curvature radius R1 of the first arc portion (5) is smaller than the curvature radius R2 of the second arc portion (6). In this case, the distance of the outermost end (second position P2) of the scroll passage (31) in the radial direction from the axis (CA) of the centrifugal compressor can be shortened. This makes it possible to downsize the scroll casing (30) and thus the centrifugal compressor (1). Further, a region (31A) of the scroll passage (31) facing the first arc portion (5) is a region where the flow from the diffuser passage (40) enters, and the swirling flow (SF) is formed on the downstream side (one-direction UD side) of the region (31A) in the scroll passage (31). Therefore, even when the curvature radius R1 of the first arc portion (5) is smaller than the curvature radius R2 of the second arc portion (6), by suppressing the occurrence of pressure loss on the downstream side of the region (31A), it is possible to sufficiently suppress the occurrence of pressure loss in the scroll passage (31).

4) In some embodiments, in the scroll casing (3) described in 3), the near-circular scroll cross-section (42) further includes a first straight portion (8) connecting the first arc portion (5) and the second arc portion (6).

When the distance of the outermost end (second position P2) of the scroll passage (31) in the radial direction from the axis (CA) of the centrifugal compressor (1) is shortened, it may be difficult to directly connect the first arc portion (5) and the second arc portion (6). According to the above configuration 4), with the first straight portion (8) connecting the first arc portion (5) and the second arc portion (6), the shape in which the first arc portion (5) and the second arc portion (6) are connected can be easily obtained.

5) In some embodiments, in the scroll casing (3) described in 2), the near-circular scroll cross-section (42) satisfies a relationship of R2/R1≥0.8 and R3/R2≥0.8.

According to the above configuration 5), the near-circular scroll cross-section (42) satisfies a relationship of R2/R1≥0.8. In other words, the curvature radius R2 of the second arc portion (6) has a curvature radius reduction ratio of 20% or less with respect to the curvature radius R1 of the first arc portion (5). When the curvature change amount between the first arc portion (5) and the second arc portion (6) is small, it is possible to effectively suppress the occurrence of pressure loss due to a sudden change in curvature between the first arc portion (5) and the second arc portion (6). Further, the near-circular scroll cross-section (42) satisfies a relationship of R3/R2≥0.8. In other words, the curvature radius R3 of the third arc portion (7) has a curvature radius reduction ratio of 20% or less with respect to the curvature radius R2 of the second arc portion (6). When the curvature change amount between the second arc portion (6) and the third arc portion (7) is small, it is possible to effectively suppress the occurrence of pressure loss due to a sudden change in curvature between the second arc portion (6) and the third arc portion (7).

6) In some embodiments, in the scroll casing (3) described in 4) or 3), the near-circular scroll cross-section (42) satisfies a relationship of R3/R2≥0.8.

According to the above configuration 6), the near-circular scroll cross-section (42) satisfies a relationship of R3/R2≥0.8. In other words, the curvature radius R3 of the third arc portion (7) has a curvature radius reduction ratio of 20% or less with respect to the curvature radius R2 of the second arc portion (6). When the curvature change amount between the second arc portion (6) and the third arc portion (7) is small, it is possible to effectively suppress the occurrence of pressure loss due to a sudden change in curvature between the second arc portion (6) and the third arc portion (7).

7) In some embodiments, in the scroll casing (3) described in any one of 1) to 6), with respect to an angular position (θ) about a scroll center (O) of the scroll passage (31), when a joint position between a winding start (311) and a winding end (312) of the scroll passage (31) is defined as 60 degrees, and the angular position (θ) is defined such that the angle gradually increases from the joint position downstream in the scroll passage (31), the near-circular scroll cross-section (42) is formed in a range (S) where the angular position (θ) is from 120 degrees to 360 degrees.

The scroll passage (31) has a smaller scroll cross-sectional area as it is closer to the winding start (311). Therefore, it may be difficult to form the near-circular scroll cross-section (42) in the vicinity of the winding start. According to the above configuration 7), since the near-circular scroll cross-section (42) is formed in the range (S) where the angular position θ is from 120 degrees to 360 degrees, which is easy to form the near-circular scroll cross-section (42), the occurrence of pressure loss in the scroll passage (31) can be sufficiently suppressed.

8) In some embodiments, in the scroll casing (3) described in any one of 1) to 7), the third arc portion (7) is formed so as to include at least the third position (P3), the fourth position (P4), and the fifth position (P5).

According to the above configuration 8), since the third arc portion (7) includes the third position (P3), the fourth position (P4), and the fifth position (P5), the near-circular scroll cross-section (42) can have a gentle change in curvature in the range from the third position to the fifth position, which is important for determining the swirling state of the swirling flow (SF) formed in the scroll cross-section (42). Thus, it is possible to effectively suppress the occurrence of pressure loss due to a sudden change in curvature in the above-described range.

9) A centrifugal compressor (1) according to at least one embodiment of the present disclosure is provided with the scroll casing (3) described in any one of 1) to 8).

According to the above configuration 9), the occurrence of pressure loss in the scroll passage (31) can be suppressed, so that the efficiency of the centrifugal compressor (1) can be improved. In particular, the efficiency of the centrifugal compressor (1) can be effectively improved during the high flow rate operation.

REFERENCE SIGNS LIST

1 Centrifugal compressor
2 Impeller
21 Hub
22 Outer surface
23 Impeller blade
24 Tip-side edges
3, 30 Scroll casing
31 Scroll passage
31A Region
32, 32A to 32E Scroll part
320 Inner peripheral surface
33 Fluid introduction port
34 Fluid discharge port
35 Shroud surface
36 Intake passage
37 Intake passage part
370 Inner wall surface
38 Shroud part
39 Impeller chamber
40 Diffuser passage
41 Tip-side passage surface
42, 42A Scroll cross-section
5, 5A First arc portion
51, 51A Upstream end
52, 52A Downstream end
6, 6A Second arc portion
61, 61A Upstream end
62, 62A Downstream end
7 Third arc portion
71 Upstream end
72 Downstream end
8 First straight portion
10 Turbocharger
11 Turbine
12 Rotational shaft
13 Turbine rotor
14 Turbine casing
141 Exhaust gas introduction port
142 Exhaust gas discharge port
15 Bearing
16 Bearing housing
161 Impeller chamber forming surface
162 Hub-side passage surface
CA Axis
P1 First position
P2 Second position
P3 Third position
P4 Fourth position
P5 Fifth position
P6 Position
R1 to R5 Curvature radius
S, T Range
SF Swirling flow
UD One-direction
X Axial direction
XF Front side (in axial direction)
XR Rear side (in axial direction)
Y Radial direction

The invention claimed is:

1. A scroll casing of a centrifugal compressor, comprising a scroll part forming a scroll passage of the centrifugal compressor, wherein, on an inner peripheral surface of the scroll part, when a connection position with a hub-side passage surface of a diffuser passage of the centrifugal compressor is defined as a first position, an outermost end in a radial direction of the centrifugal compressor is defined as a second position, a foremost end in an axial direction of the centrifugal compressor is defined as a third position, an innermost end in the radial direction is defined as a fourth position, a first direction is defined as a direction from the first position toward the fourth position along the inner peripheral surface of the scroll part, and an end position on a one-direction side, which is a side in the first direction, is defined as a fifth position, the scroll part has a near-circular scroll cross-section which includes at least:

a first arc portion extending from the first position in the first direction, a second arc portion formed on the inner peripheral surface from the first arc portion in the first direction so as to include at least a part of a region between the second position and the fourth position, the second arc portion including the second position and the third position, and a third arc portion formed on the inner peripheral surface from the second arc portion in the first direction so as to include at least the fifth position, and the near-circular scroll cross-section satisfies a relationship of $R2>R3$, where R2 is a curvature radius of the second arc portion, and R3 is a curvature radius of the third arc portion.

2. The scroll casing according to claim 1, wherein the near-circular scroll cross-section satisfies a relationship of $R1>R2$, where R1 is a curvature radius of the first arc portion.

3. The scroll casing according to claim 1, wherein the near-circular scroll cross-section satisfies a relationship of $R2>R1$, where R1 is a curvature radius of the first arc portion.

4. The scroll casing according to claim 3, wherein the near-circular scroll cross-section further includes a first straight portion connecting the first arc portion and the second arc portion.

5. The scroll casing according to claim 2, wherein the near-circular scroll cross-section satisfies a relationship of $R2/R1 \geq 0.8$ and $R3/R2 \geq 0.8$.

6. The scroll casing according to claim 3, wherein the near-circular scroll cross-section satisfies a relationship of $R3/R2 \geq 0.8$.

7. A scroll casing of a centrifugal compressor, comprising a scroll part forming a scroll passage of the centrifugal compressor, wherein, on an inner peripheral surface of the scroll part, when a connection position with a hub-side passage surface of a diffuser passage of the centrifugal compressor is defined as a first position, an outermost end in a radial direction of the centrifugal compressor is defined as a second position, a foremost end in an axial direction of the centrifugal compressor is defined as a third position, an innermost end in the radial direction is defined as a fourth position, a first direction is defined as a direction from the first position toward the fourth position along the inner peripheral surface of the scroll part, and an end position on a one-direction side, which is a side in the first direction, is defined as a fifth position, the scroll part has a near-circular scroll cross-section which includes at least:

a first arc portion extending from the first position in the first direction, a second arc portion formed on the inner peripheral surface from the first arc portion in the first direction so as to include at least a part of a region between the second position and the fourth position, and a third arc portion formed on the inner peripheral surface from the second arc portion in the first direction so as to include at least the fifth position, and the near-circular scroll cross-section satisfies a relationship of R2>R3, where R2 is a curvature radius of the second arc portion, and R3 is a curvature radius of the third arc portion, wherein, with respect to an angular position about a scroll center of the scroll passage, when a joint position between a winding start and a winding end of the scroll passage is defined as 60 degrees, and the angular position is defined such that the angle gradually increases from the joint position downstream in the scroll passage, the near-circular scroll cross-section is formed in a range where the angular position is from 120 degrees to 360 degrees.

8. The scroll casing according to claim 1, wherein the third arc portion is formed so as to include at least the third position, the fourth position, and the fifth position.

9. A centrifugal compressor, comprising the scroll casing according to claim 1.

* * * * *